US005757920A

United States Patent [19]

Misra et al.

[11] Patent Number: 5,757,920
[45] Date of Patent: May 26, 1998

[54] LOGON CERTIFICATION

[75] Inventors: Pradyumna K. Misra, Issaquah; Arnold S. Miller, Bellevue; Richard B. Ward, Seattle, all of Wash.

[73] Assignee: Microsoft Corporation, Redmond, Wash.

[21] Appl. No.: 816,386

[22] Filed: Mar. 13, 1997

Related U.S. Application Data

[62] Division of Ser. No. 277,144, Jul. 18, 1994.

[51] Int. Cl.$^6$ .................................................. H04K 1/00
[52] U.S. Cl. .................................................. 380/25; 380/21
[58] Field of Search .................................................. 380/4, 21, 23, 380/24, 25, 30, 49

[56] References Cited

U.S. PATENT DOCUMENTS

| 4,896,319 | 1/1990 | Lidinsky et al. | 370/60 |
|---|---|---|---|
| 4,993,068 | 2/1991 | Piosenka et al. | 380/23 |
| 5,224,163 | 6/1993 | Gasser et al. | 380/30 |
| 5,235,642 | 8/1993 | Wobber et al. | 380/25 |
| 5,335,346 | 8/1994 | Fabbio | 395/600 |
| 5,534,855 | 7/1996 | Shockley et al. | 380/25 |
| 5,557,678 | 9/1996 | Ganesan | 380/21 |
| 5,560,008 | 9/1996 | Johnson et al. | 395/650 |
| 5,588,061 | 12/1996 | Ganesan et al. | 380/30 |

FOREIGN PATENT DOCUMENTS

| 421409A2 | 4/1991 | European Pat. Off. | G07F 7/10 |
|---|---|---|---|
| 2238636 | 6/1991 | United Kingdom | G06F 1/00 |

OTHER PUBLICATIONS

Steiner, Jennifer G. et al., "Kerberos: An Authentication Service for Open Network Systems," in *USENIX Winter Conference Proceedings*, Feb. 9–12, 1988, Dallas, Texas, pp. 191–202.

Neuman, Clifford B., "Proxy–Based Authorization and Accounting for Distributed Systems," Department of Computer Science and Engineering, University of Washington, Technical Report 91–02–01, Mar., 1991, pp. 1–14.

Karger, Paul A., and Andrew J. Herbert, "An Augmented Capability Architecture to Support Lattice Security and Traceability of Access," in *Proceedings of the 1984 Symposium on Security and Privacy*, Apr. 29–May 2, 1984. Sponsored by the Technical Committee on Security and Privacy IEEE Computer Society, pp. 2–12.

Saltzer, Jerome H., and Michael D. Schroeder, "The Protection of Information in Computer Systems," in *Proceedings of the IEEE 63(9)*, Sep.,1975, pp. 1278–1308.

Israel, Jay E., and Theodore A. Linden, "Authentication in Office System Internetworks," *ACM Transactions on Office Information Systems 1(3)*, Jul., 1983, pp. 193–210.

Ciminiera, L., and A. Valenzano, "Efficient Authentication Mechanisms Using the iAPX–432," *Interfaces in Computer 3*, 1985, pp. 111–124.

(List continued on next page.)

*Primary Examiner*—David C. Cain
*Attorney, Agent, or Firm*—Seed and Berry LLP

[57] ABSTRACT

Logon certificates are provided to support disconnected operation within the distributed system. Each logon certificate is a secure package holding credentials information sufficient to establish the identity and rights and privileges for a user/machine in a domain that is not their home domain. When a user/machine attempts to connect to the system at a domain other than the home domain of the user/machine, the user/machine presents a logon certificate that evidences his credentials. The domain where the user/machine attempts to connect to the system, decrypts and unseals the secure package as required to obtain the credentials information contained therein. If the user/machine has sufficient credentials, the user/machine is permitted to connect to the system. If the user/machine lacks sufficient credentials, the user/machine is not permitted to connect to the system.

16 Claims, 6 Drawing Sheets

OTHER PUBLICATIONS

Pinkas, Denis, "An Access Control Model for Distributed Systems Based on the Use of Trusted Authorities," in *SECURICOM. 7th Worldwide Congress on Computer and Communications Security and Protection*, 1989, pp. 257–270.

Kohl, John, and Clifford Neuman, Kerberos Version 5 RFC, Revision #5, Memorandum of Apr. 9, 1992, pp. 1–68.

Muftic, Sead, and Morris Sloman, "Security architecture for distributed systems," *Computer Communications*, 17(7): 492–500; Jul., 1994.

Bacon et al., "Extensible Access Control for a Hierarchy of Servers," *Operating Systems Review* 28(3); 4–15; 1994.

LOGON CERTIFICATION

CROSS-REFERENCE TO RELATED APPLICATION

This application is a divisional of U.S. patent application Ser. No. 08/277,144, filed Jul. 18, 1994, now pending.

TECHNICAL FIELD

The present invention relates generally to data processing systems and, more particularly, to the use of logon certificates in a distributed system.

BACKGROUND OF THE INVENTION

Many conventional distributed systems do not support roaming users or roaming machines. A roaming user may wish to logon to the distributed system at domains other than his home domain. Similarly, roaming machines may wish to connect to the distributed system at sites outside of their home domain. The roaming user may use a roaming machine (e.g., a portable computer) to logon or may instead use a connected computer that is available at the logon site. The conventional systems that have supported such roaming users and machines have provided the support at the expense of efficiency and increased vulnerability. For example, certain conventional distributed systems store credentials information at a home domain of the user/machine. The credentials information stored at the home domain is examined when the user/machine tries to connect to the system at a different domain. The credentials information is examined to determine whether the user/machine is permitted to connect to the distributed system. In order to facilitate roaming users and machines, these conventional distributed systems replicate the credentials information to each potential connection domain in the distributed system (i.e., to each domain).

This approach of replicating credentials across the system suffers from several drawbacks. First, the replication of the credentials information is costly and time-consuming. Second, the credentials information must be replicated frequently because credentials must be updated each time that the credentials information of any user or machine changes. Third, the replication of credentials may not be successful due to intermittent failure, and, thus, the proper credentials information may not reach all the targeted destinations in the distributed system. Fourth, this approach poses a security threat because it provides more locations within the distributed system that are susceptible to attack.

SUMMARY OF THE INVENTION

The drawbacks of the conventional systems are overcome by the present invention. In accordance with a first aspect of the present invention, a method is practiced in the distributed system that has a facility for checking authorization and authentication information, typically referred to as credentials. In this method, a principal, such as a user or portable computer, is provided with a secure package that holds certified credential information for the principal. The secure package may be encrypted and/or may include a digital signature. The secure package may be provided to the principal by storing the secure package on a portable storage medium such as a floppy disk. Alternatively, the secure package may be provided to the principal by storing the secure package in the memory of a portable computer of the user.

Once the principal has been provided with a secure package, the principal may send a request to logon to the distributed system along with the certificate of credentials that is received by the distributed system. The secure package is accessed to enable the facility for checking credentials to determine whether the principal is authorized to connect to the distributed system. Where the principal is not authorized to connect to the distributed system, the principal's request to logon is denied. In contrast, where the principal is authorized to connect to the distributed system, the principal's request to connect is granted.

In accordance with another aspect of the present invention, a distributed system is logically partitioned into domains. Each user has an associated home domain. Authorization and authentication information about a user is encrypted to produce a block of encrypted credentials information. A digital signature is attached to the encrypted credentials information at the home domain for the user. The digital signature is created using a private key for the home domain. A session key is received from the user and is used to encrypt the digital signature and the block of encrypted credentials information to produce a secure package. The secure package is provided to the user to enable the user to logon to the distributed system in a domain other than the home domain.

The digital signature may be created by using a hash function to generate a hash value of the credentials information. An encryption key is selected to bulk encrypt the credentials information and then the hash value and the selected encryption key together are encrypted using the private key of the home domain. The resulting product is the digital signature.

In accordance with an additional aspect of the present invention, the method is practiced at a distributed system that has a facility for verifying and validating the credentials information. A portable computer is provided with a secure package that holds the credentials information for the computer. The portable computer is required to present the secure package when it wishes to connect to the distributed system in a domain other than its home domain. A facility for verifying and validating the credentials information examines the credentials contained within the secure package to determine whether the computer is authorized to connect to the distributed system. If the portable computer is authenticated, it is permitted to connect to the distributed system. On the other hand, where the portable computer is not authenticated, the portable computer is not allowed to connect to the distributed system.

In accordance with yet another aspect of the present invention, a method is practiced in the distributed system that includes a plurality of computers and is logically partitioned into domains. Each computer in the distributed system has an associated home domain. A secure package is provided at the home domain of the computers. A secure package holds credentials information for the selected computer. A request is received from the selected computer to connect to the distributed system at a target domain that lies outside the home domain of the selected computer. The secure package is received from the selected computer and the credentials information contained within the secure package is examined to determine whether the selected computer is authorized to be connected to the distributed system at the target domain.

In accordance with a further aspect of the present invention, a user is provided first with an option of logging on to the distributed system interactively. In this first option, a certificate of credentials is not required. The user is also provided with a second option of logging on to the distributed system wherein a certificate of credentials is required. When a request to logon using the second option is received from a user, it must be accompanied by a certificate of credentials. The certificate of credentials for the user is examined to determine whether the user has sufficient credentials to be permitted to logon. Where it is determined that the user has sufficient credentials, the user is permitted to logon. On the other hand, where it is determined that the user lacks sufficient credentials, the user is prohibited from logging on.

In accordance with a still further aspect of the present invention, a secure certificate of credentials is provided to a user to allow the user to logon to the distributed system outside of the associated home domain for the user. A start time is established for the certificate of credentials that determines when this certificate becomes valid. A time of expiration is established for the certificate of credentials. Once the time of expiration has passed, the user cannot logon using the expired certificate of credentials and any attempt by user to logon using the certificate of credentials to the distributed system is rejected by the distributed system.

In accordance with an additional aspect of the present invention, when a request is received from a user to receive a secure certificate of credentials that will enable the user to logon to the distributed system outside its associated home domain, the user is prompted for a password. The information indicative of the password is encoded into the certificate of credentials before the certificate of credentials is issued to the user. The user is required to show knowledge of the password when attempting to logon using the certificate of credentials.

In accordance with yet another aspect of the present invention, a certificate of credentials is issued to a user to enable the user to logon to the distributed system using the certificate of credentials to show that the user has proper and sufficient credentials. It is also possible to revoke the certificate of credentials so that the certificate of credentials may no longer be used to logon to the distributed system.

DETAILED DESCRIPTION OF THE INVENTION

The preferred embodiment of the present invention provides a secure and efficient approach for supporting roaming users and roaming machines in a distributed system environment. In particular, the preferred embodiment of the present invention issues secure logon certificates to users/machines which may be later presented to the distributed system at locations other than the home domains of the users/machines to enable connection to the distributed system. The logon certificates encapsulate credentials information for the users/machines. Since each user/machine carries the credentials directly to the desired connection point i.e. the domain, the credentials information held in the logon certificate need not be replicated throughout the distributed system and there is no need to establish a direct connection back to the domain controller of the home domain. Moreover, the logon certificates provide a convenient vehicle for controlling access to the system. Logon certificates are revocable and expire after a predetermined period of time. Further, encryption techniques are applied to contents of the logon certificate to ensure that the contents are secure.

Figure 1:
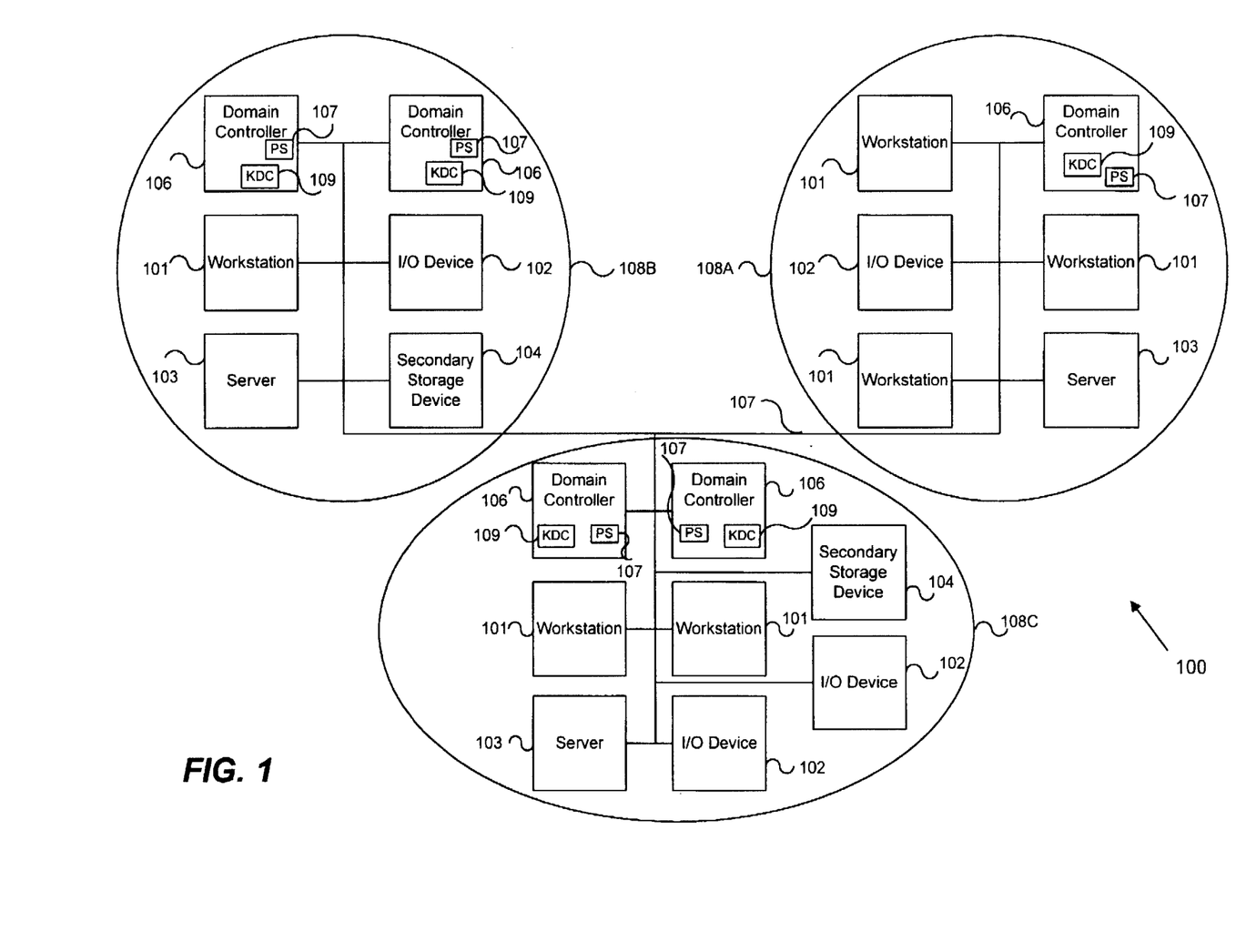
FIG. 1 is a block diagram of a distributed system that is suitable for practicing a preferred embodiment of the present invention.

FIG. 1 is a block diagram of a distributed system 100 that is suitable for practicing the preferred embodiment of the present invention. Those skilled in the art will appreciate that the configuration shown in FIG. 1 is merely illustrative and that the present invention may be practiced in other distributed system configurations. The distributed system 100 of FIG. 1 includes workstations 101, input/output (I/O) devices 102, network servers 103 and secondary storage devices 104. In addition, the distributed system 100 includes domain controllers 106 (which will be described in more detail below).

The distributed system 100 is logically partitioned into domains 108A, 108B and 108C. Each domain 108A, 108B and 108C is a self-sufficient collection of resources that is viewed as a single entity for purposes of administration, naming and security. Each domain implements its own administrative and security policies. Domains are provided to facilitate scaling and encapsulation of resources into logical units within the distributed system.

Although the preferred embodiment of the present invention utilizes domains, those skilled in the art will, nevertheless, appreciate that domains are not a necessary component for practicing the present invention. The present invention may be practiced in environments that do not utilize domains.

Each domain 108A, 108B and 108C includes at least one domain controller 106. More than one domain controller 106 may be provided within a domain so as to enhance the availability of domain controller resources. Each domain controller 106 serves as a centralized location for storing knowledge about the namespace of the distributed system 100. Among the components included within each domain controller 106 are an authorization service (AS) 107 and an authentication service, known as the key distribution center (KDC) 109. The AS 107 is a service that controls authorization rights that are provided to clients and validates requests to gain access to servers. A client, in this context, is a process that makes use of a network service on behalf of a user. The KDC 109 acts as an authentication service in that it authenticates the identities of principals. A principal is a uniquely named client or server instance. A server is a principal that provides a resource to clients. The AS 107 and KDC 109 work in conjunction to perform authorization and authentication respectively when a user wishes to logon to the system 100 and use its resources.

It is helpful to first look at the authentication performed during a logon. For each user/machine, the user/machine engages in an authentication protocol, such as the Kerberos, version 5, release 5 protocol developed by the Massachusetts Institute of Technology, which will be described in more detail below. For the present invention, we are concerned solely with the authentication that is performed when a user/machine seeks to connect to the system outside its home domain. Through this protocol, users and machines exhibit knowledge of shared secrets that serve as credentials that verify the identity of the user/machine.

Each domain controller 106 holds information about users and machines for which the domain is the home domain. The domain controller 106 of a domain holds both the authentication credentials and authorization information for each of its users and machines. Logon certificates provide a vehicle to demonstrate that the user/machine has sufficient credentials to connect to the non-home domain without contacting the home domain. Thus, a user/machine may freely roam the distributed system and connect to all domains where such connection is authorized. This approach, however, does not require replication of the credentials throughout the distributed system, as required by conventional systems.

The logon certificates may be created in part through the use of encryption mechanisms. In particular, the logon certificates may be made secure by using an asymmetric encryption strategy wherein a public key and a private key pair is utilized to encrypt portions of the logon certificates. A noteworthy characteristic of an asymmetric encryption scheme is that it allows different keys for encryption and decryption unlike symmetric encryption systems that use the same key for both encryption and encryption. These keys are referred to as public and private key pair. Each domain has an associated key pair that includes a public key and a private key that are used in encryption as will be described in more detail below. The public key is published exclusively to domain controllers 106 in other domains through a location and distribution protocol provided by the KDC 109 of the domain controller 106. The publication occurs during domain installation without user involvement. Thus, for instance, a domain controller 106 in domain 108A publishes its public key to domain controllers 106 in domains 108B and 108C. So as to enhance the integrity of the system, the public keys are only published to the domain controllers 106 in other domains and not to other entities. Hence, the public keys are not made entirely public knowledge. The private key, in contrast, is kept secret within the domain controller 106 of the domain.

Figure 2A:
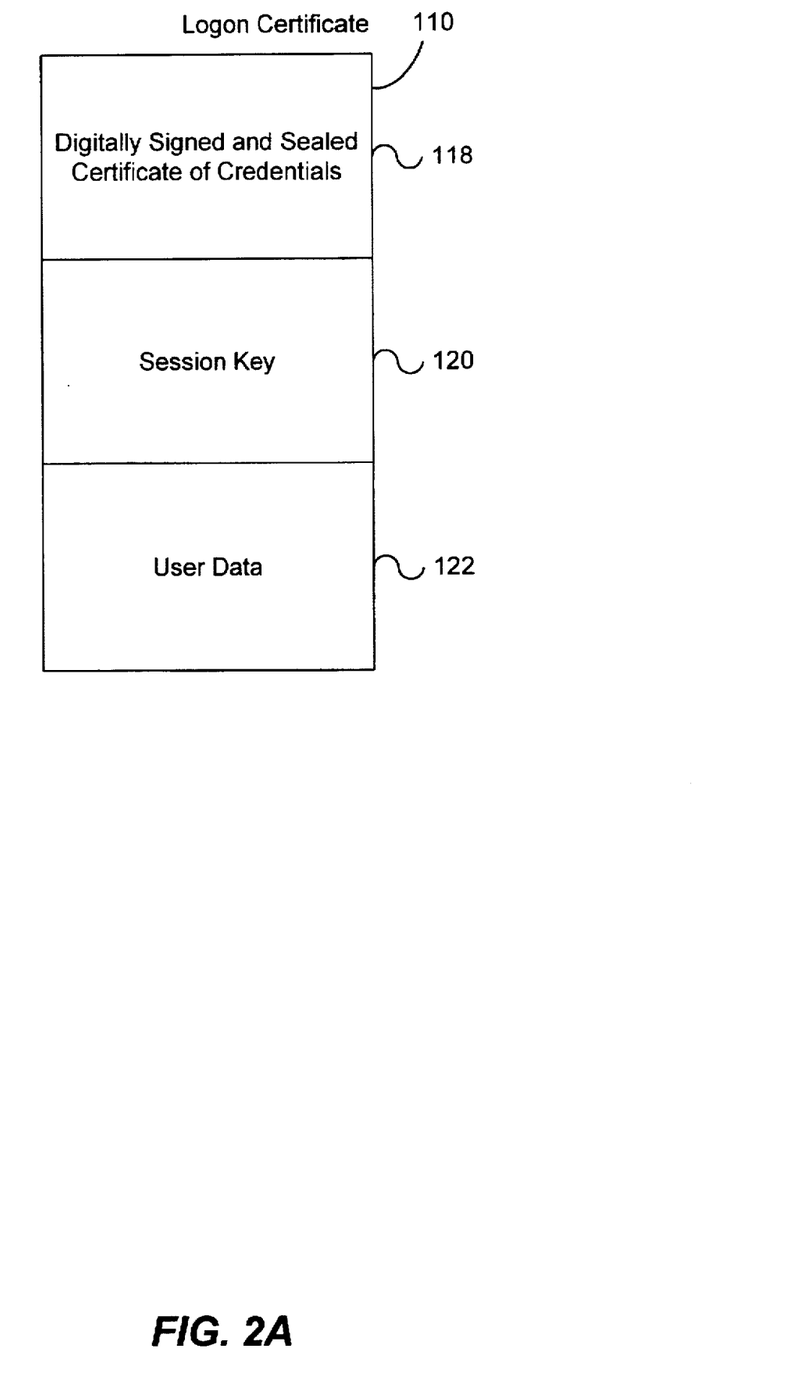
FIG. 2A is a diagram illustrating the contents of a logon certificate in accordance with the preferred embodiment of the present invention.

FIG. 2A is a block diagram showing the components of a logon certificate 110. A logon certificate 110 is a sealed packet that includes a digitally signed and sealed certificate of credentials 118, a session key 120 and, optionally, user or machine specific data 122. The logon certificate 110 also contains information such as the time the logon certificate was issued, the time of expiration of the logon certificate and the time at which the logon certificate becomes valid (i.e., start time).

Figure 2B:
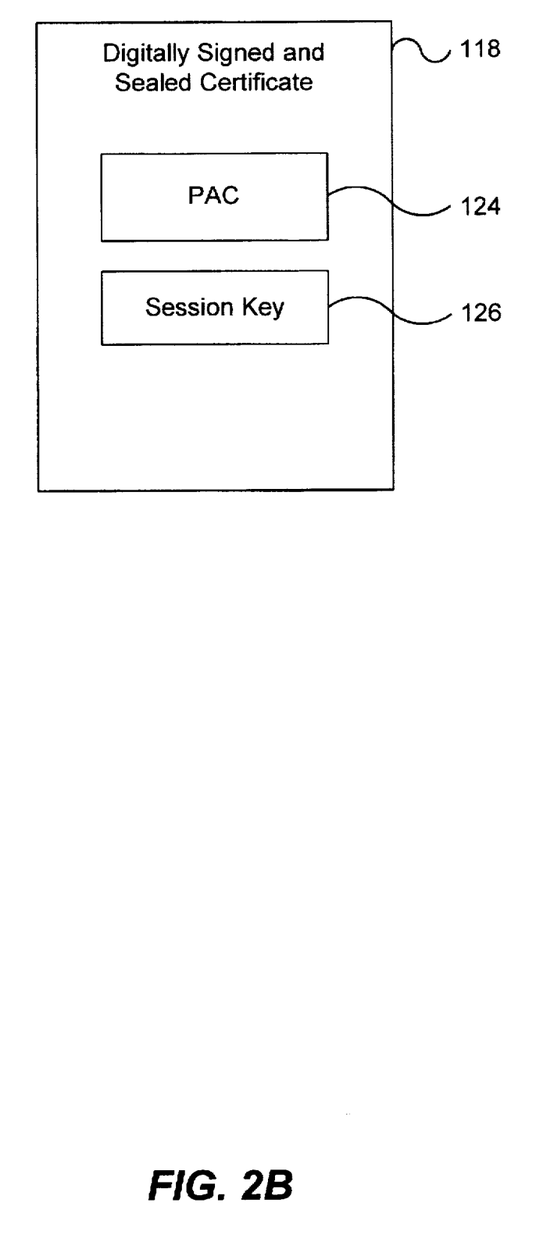
FIG. 2B is a diagram illustrating in more detail the contents of the digitally signed and sealed certificate of FIG. 2A.

The digitally signed and sealed certificate 118 includes at least (as shown in FIG. 2B) a privileged attribute certificate (PAC) 124 and another copy of the session key 126. The PAC 124 encapsulates authorization information for a user or machine. For instance, a user's security ID and the security ID of all the groups of which the user is a member are included in the PAC for a user, along with other authorization information, such as the user's privileges and the like. Only authentication information for a machine is encapsulated in a logon certificate for the machine. In the preferred embodiment of the present invention, the digitally signed and sealed certificate 118 is created by initially generating a hash of the contents to be included within the digitally signed and sealed certificate. A one-way hash function, such as the MD5 hash function proposed by Ron Rivest, is used to generate the hash of the contents of the digitally signed and sealed certificate 118. A random encryption key is then selected and the data to be included in the certificate 118 is encrypted using the randomly selected key using a bulk encryption algorithm like the RC4 encryption algorithm proposed by Ron Rivest. Lastly, a digital signature is created by encrypting the pair of the hash and the encryption key together by the domain's private key for the domain issuing the certificate using an asymmetric encryption algorithm like the RSA encryption algorithm. Note that use of MD5, RC4, and RSA is not a requisite to practicing this invention and comparable algorithms may be substituted for these algorithms.

The session key 126 is a dynamically generated key that is particular to a given communications session. The session key may be used to encrypt communications during a session between a client and a server, such as between a user's machine and the KDC 109.

The logon certificate 110 that includes a session key, a digital signature, a sealed certificate of credentials, and other information, like issuing domain, etc., is sealed by further encrypting it with a user-supplied password. The domain where the logon certificate 110 is later used will have been a recipient of the public decryption key that was distributed. If this domain has been configured to accept certificates from the issuing domain, it will decrypt the logon certificate in order to recover its contents.

Those skilled in the art will appreciate that the contents of the logon certificate 110 may include additional information or different information from that shown in FIGS. 2A and 2B. The information depicted in FIGS. 2A and 2B constitutes what is included in the preferred embodiment of the present invention and is not intended as a limitation of the scope of the present invention as defined in the appended claims.

Figure 3:
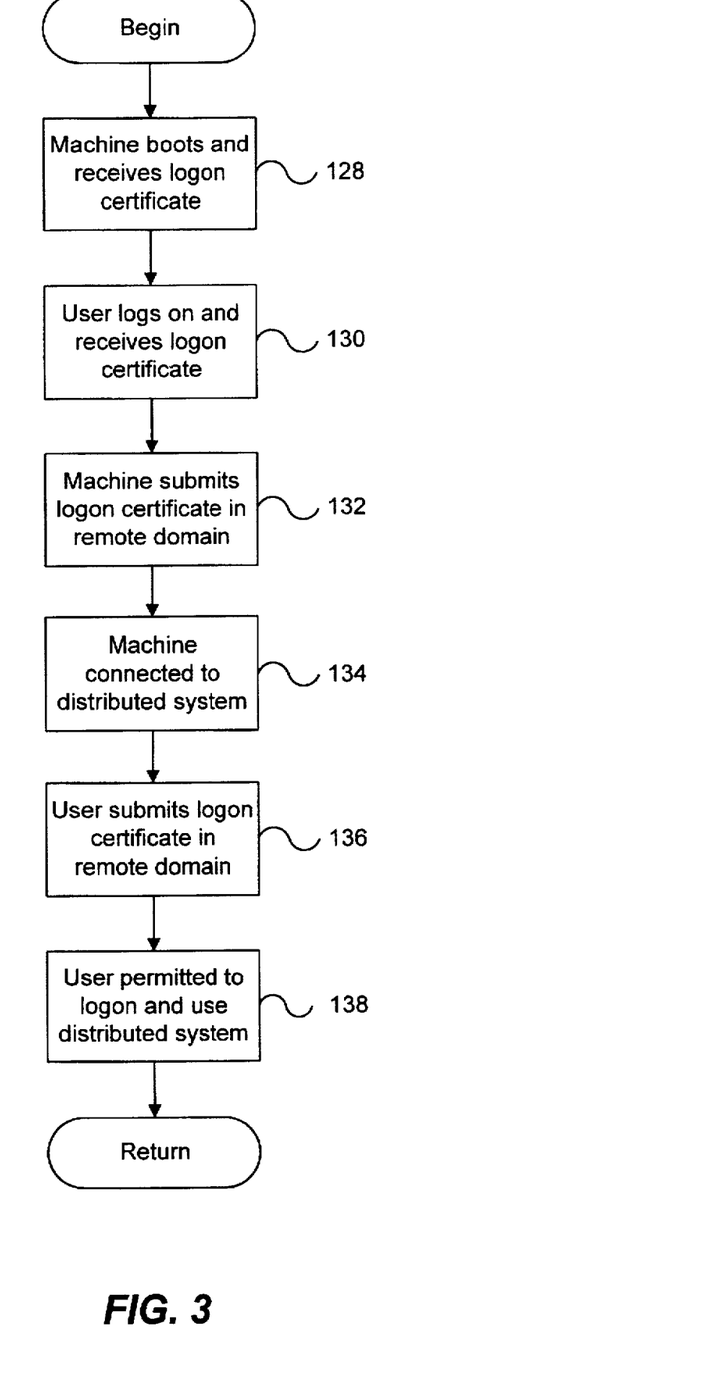
FIG. 3 is a flow chart illustrating the steps performed to obtain and use logon certificates in the preferred embodiment of the present invention.

FIG. 3 is a flow chart illustrating the basic steps involved in using the logon certificates in the preferred embodiment of the present invention. The sequence of steps is intended to merely be illustrative, and the steps may be performed in a different order. Moreover, all the steps need not be performed to practice the present invention.

Every time a machine is booted in its home domain it obtains a logon certificate 110 from the domain controller of its home domain that certifies the identity of the machine (step 128). The certificate is obtained and issued if and only if machine was able to authenticate itself to the distributed system. The machine can later submit the logon certificate 110 to the domain controller 106 of another domain to which it is being connected when the machine boots. Similarly, every time a user logs on in his home domain, he obtains a logon certificate 110 from the domain controller 106 (step 130 in FIG. 3). Again, the certificate is issued if and only if the user was able to authenticate himself to the distributed system. The logon certificate 110 may then later be used to logon at a site in a different domain. The non-home domain to which the user is permitted to logon using the logon certificate 110 is known as the "connection domain" and provides connectivity services to the user.

A user may request to download the logon certificate 110 onto a removal storage media, such as a floppy diskette. When the user requests to download a logon certificate 110 onto such a removable storage media, he is prompted to supply a password. A one-way hash function is used to hash this password, which is then used to generate an encryption key, which in turn is used to further encrypt the logon certificate. This password is required to prevent any third party that is in possession of a logon certificate on a removable storage media from fraudulently logging on as the user to whom the logon certificate was issued.

Once the machine and user have received logon certificates 110, typically, the user tries to boot the machine at a remote domain within the distributed system 100. During the boot of the machine at the remote domain, the machine submits the logon certificate 110 to the distributed system 100 to identify itself and to verify that the machine is authorized to be connected to the distributed system (step 132 in FIG. 3). If the machine submits the proper credentials, the machine is then connected to the distributed system 110 (step 134). The user may then logon to the distributed system. As part of the logon process (as will be described in more detail below), the user submits the logon certificate 110 (step 136). If the logon certificate 110 indicates that the user is an authorized user, the user is permitted to logon and use the distributed system (step 138).

It should be appreciated that the steps shown in the flow chart of FIG. 3 are for an instance wherein the user is carrying a portable machine for logging on at a remote domain. There may be instances wherein the user, instead, utilizes a machine that is already connected to the distributed system 100 at a remote domain. In such an instance, the user may be required to present a logon certificate 110 to logon at the remote domain, but there may be no logon certificate on the machine the user is using. Alternatively, there may be instances wherein a portable computer is used by a user at his home domain. In such an instance, the portable computer may present a logon certificate 110 to get connected to the distributed system 100 but the user need not present such a logon certificate.

In order to understand how the logon certificates 110 are used in logging on to the distributed system 100, it is helpful to review some of the fundamentals of the Kerberos protocol. Kerberos uses "tickets" to regulate access by clients to servers. A ticket is a data structure, such as a record, that holds data like the target server name, client name and authorization data, that helps a client to authenticate itself to a server. The ticket allows a client to receive service from a server.

An authenticator is a data structure that includes the client's name, time stamp, and may also include an optional session key. The authenticator includes data that is encrypted in the session key. This data evidences that the sender knows the session key. Further, the time stamp helps to minimize the time period in which an eavesdropper may use a copied ticket and authenticator pair.

In Kerberos, session keys are used to verify the credentials of clients and may also be used to encrypt messages between two parties (e.g., a client and a server) during a given communication session. When the communication session ends, the session key is destroyed. The session key is shared only between the two parties that utilize it.

Kerberos maintains an authentication database that correlates clients, such as users, with their associated secret keys. As was mentioned above, a secret key is typically an encrypted password or is derived from one using a pre-specified algorithm. This authentication database is utilized to retrieve the secret keys of the clients as needed during execution of the protocol.

Figure 4A:
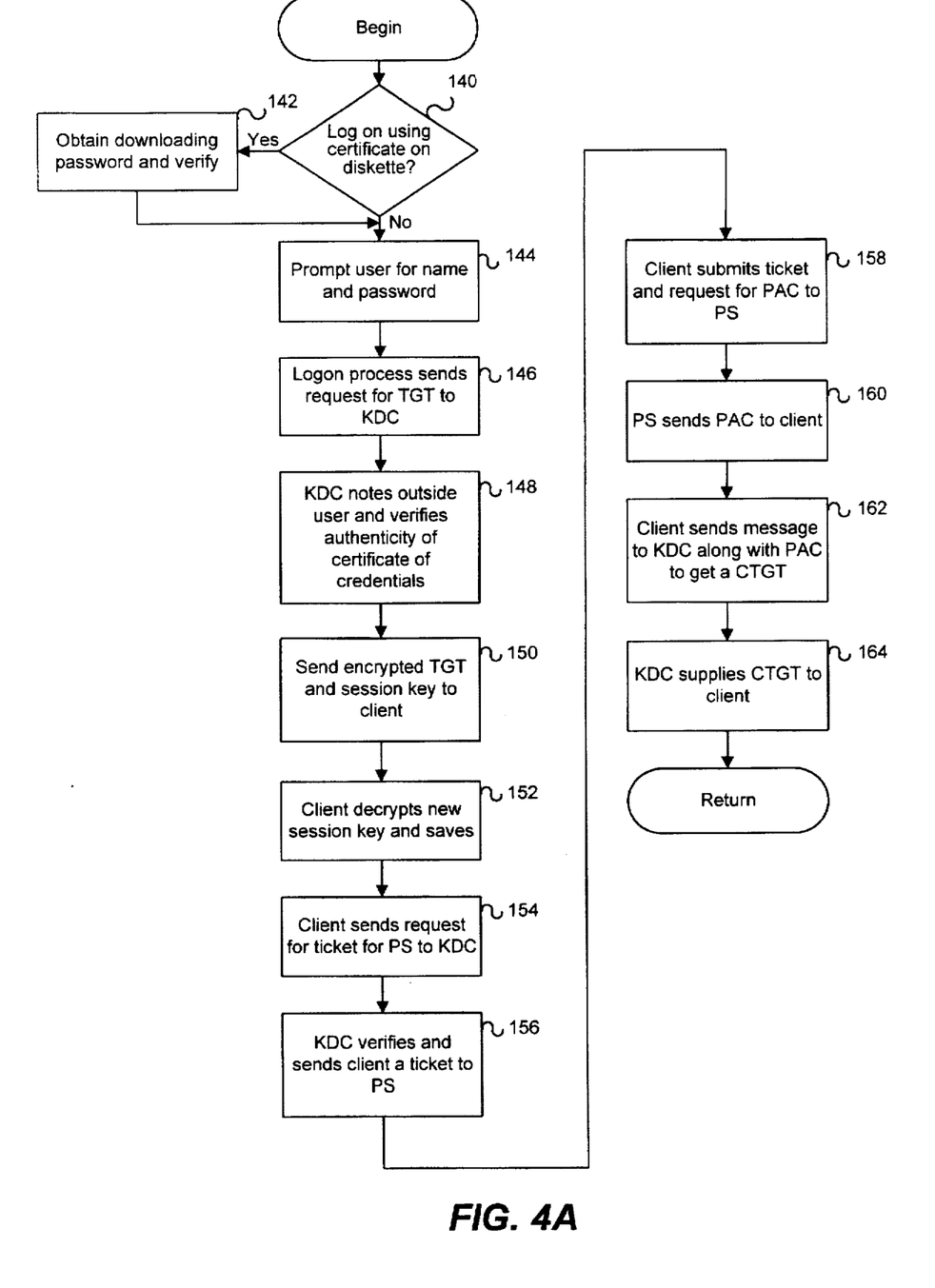
FIG. 4A is a flow chart illustrating the steps that are performed for a user to logon to the distributed system using a logon certificate in accordance with the preferred embodiment of the present invention.
Figure 4B:
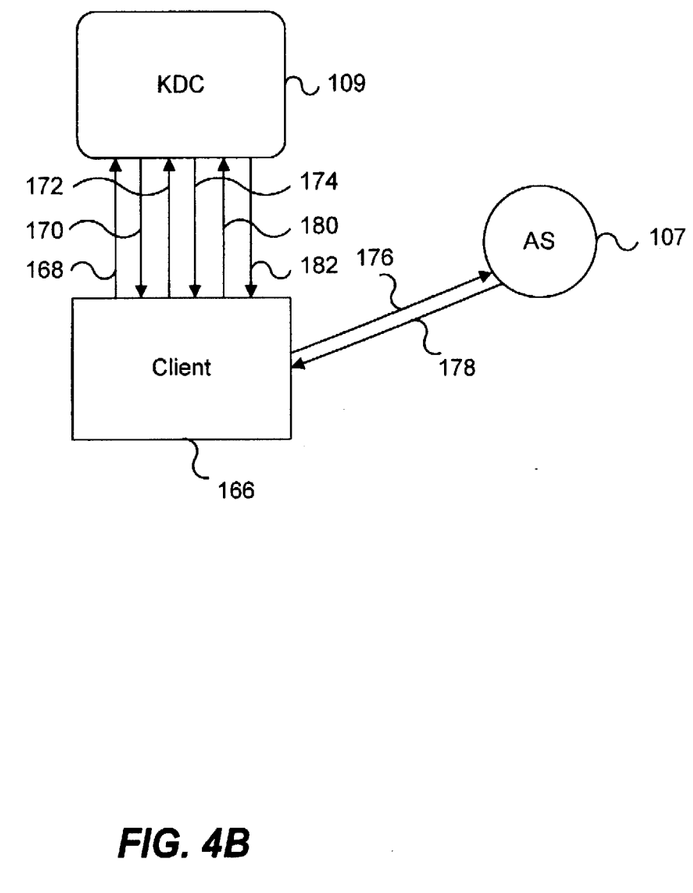
FIG. 4B is a block diagram illustrating the interaction between major components of the distributed system during a logon in accordance with the preferred embodiment of the present invention.

As mentioned above, logon certificates 110 are used when a user attempts to logon to the distributed system 100. FIG. 4A shows a flow chart of the steps that are performed in such an instance. The steps of the flow chart of FIG. 4A will be described below in conjunction with the block diagram of the system components shown in FIG. 4B (which depicts the major components that play a role in authorizing and authenticating the user). When a roaming user attempts to logon, he is presented with a logon menu that includes an option to "logon via certificate." The logon menu is provided as part of a local logon process that serves as a client for the user. If the user selects this option, he may wish to logon utilizing a logon certificate 110 carried on a removable storage media, such as a floppy diskette or use the logon certificate stored on the machine he is attempting to logon from. Thus, in step 140, it is determined whether the user is logging on using a certificate on a removable storage media or a certificate stored in the user's machine for the user. If the user decides to logon using a logon certificate 110 that is contained on a removable storage media, the user must provide the downloading password that he was required to enter when downloading the certificate onto the removable storage media and the system verifies that this is the correct downloading password (step 142). Failure to supply the correct downloading password will prevent the user from using the logon certificate 110 stored on the removable storage media. If the user wishes to use the logon certificate stored on the machine (most likely the portable computer the user uses often), then he must supply his normal logon password.

In either case the logon process uses this password to generate an encryption key using a pre-specified and fixed algorithm. It then uses this key to decrypt the logon certificate retrieved from either the removable storage media or the machine itself. The client thus obtains an encrypted session key that was stored in the encrypted logon certificate and is also stored in the encrypted block of credentials. The client will use this encrypted session key exactly in the way it would use the key derived from the user-supplied password in case of a normal logon sequence without using logon certificate.

The system initiates an authentication exchange by prompting the user for the user's name and password (step 144). The logon process then sends a request for a ticket granting ticket (TGT) to KDC 109, which runs on a domain controller 106 in the local domain (step 146). The logon certificate 110 is sent along with the request for TGT. The request for the TGT is represented by arrow 168 in FIG. 4B. The KDC 109 determines that the logon request is by a user in some other domain and then looks up the public key associated with the domain specified in the logon certificate. It uses this public key to unseal the certificate of credentials and verify that the certificate was indeed issued by the domain named in the un-encrypted part of the logon certificate 110 and that the logon certificate is valid (i.e. it has not expired) and that the current time is past the start time held in the certificate. The KDC 109 also obtains the encrypted session key from the sealed certificate of credentials 118 and uses it exactly in the same way as it would have used the encryption key derived from the one way hash of user's password stored in its database for the users it has entries for in its authentication database. Once the KDC 109 has verified the authenticity of the certificate 118 by verifying the digital signature and concluded that the certificate is valid (step 148), the KDC 109 then sends a TGT and a new session key (to be used in further communications) that has been encrypted by the session key obtained from the sealed certificate, to the client 166 (step 150) as represented by arrow 170.

The client 166 decrypts the new session key sent by the KDC(since the client is in possession of the session key from decrypting the logon certificate as described above) and saves the new session key for future use (step 152). The client 166 then initiates a request for a credentials ticket granting ticket (CTGT) by asking the KDC 109 for a service ticket to the AS 107 (step 154). The CTGT is used to obtain tickets to servers that require the client to provide authorization information. This request is represented by arrow 172 in FIG. 4B. The request includes the TGT that was received earlier from the KDC 109.

The KDC 109 receives the request from the client 166 and responds to the request by returning a ticket for the AS 107 to the client 166 that includes the digitally signed and sealed certificate 118 (step 156). The sending of the ticket to the AS 107 is represented by arrow 174 in FIG. 4B.

The client 166 then requests a PAC from the AS 107. This PAC will eventually be incorporated into the CTGT that is ultimately issued to the client 166 (step 158). The request is represented by arrow 176 in FIG. 4B. The AS 107 normally accesses an authorization database to obtain authorization information. However, in the present instance, since the user is logging on using a logon certificate, the user is outside his home domain, and thus, the authorization database holds no information about the user. Thus, to provide the PAC, the AS 107 uses the domain's public key to decrypt the digital signature and thus, obtains the symmetric key used for encrypting the certificate of credentials and the hash value of its contents. The AS 107 decrypts the certificate of credentials and recomputes the hash of decrypted contents and that must match the hash value obtained from the digital signature. Having verified this and also ascertaining the validity of other aspects of certificate, the AS 107 prepares a PAC from the contents of the digitally signed and sealed certificate 118 in the ticket to craft user's rights and privileges. The AS 107 also marks this PAC as the one generated via logon certificate, a fact that can be used by the local security policy of the target domain. Those skilled in the art will appreciate the fact that the AS 107 can augment the contents of the PAC with additional privileges or restrictions. It then seals the PAC with the secret key that it shares with the KDC before returning it to the client. The PAC is sealed by encrypting it with the secret key of the KDC 109 so that the client cannot access it. The AS 107 returns the sealed PAC (note arrow 178 in FIG. 4B) to the client 166 (step 160).

The client 166 sends a message to the KDC 109, along with the sealed PAC (note arrow 180 in FIG. 4B) to get a CTGT from the KDC (step 162). The KDC 109 generates the CTGT so as to include the PAC and forwards (note arrow 182 in FIG. 4B) the CTGT to the client (step 148). The CTGT contains the IDs for the user, the privileges of the user, group memberships of the user, and is sealed by encryption using the secret key of the PS. At this juncture, the user appears as if he had an account in the domain to which he is connected. If the user wishes to access a server, he may use his TGT or CTGT.

When a machine is initially booted and is connected to the distributed system 100, the above steps beginning with step 129 are repeated. The machine takes the place of the user in these steps. Thus, the machine may be validated as a proper machine to be part of the distributed system 100.

As mentioned above, logon certificates 110 are both revocable and expirable. As to the expirable nature of the logon certificates 110, each certificate includes a start time at which it becomes valid and an expiration time at which it becomes invalid. In order for a logon certificate 110 to be valid, the start time of the logon certificate must have already been reached and the expiration time of the logon certificate 110 must not yet have been reached.

A logon certificate 110 is revocable and may be explicitly revoked. When an account is inactivated or an administrator instructs the system to revoke logon certificates 110, the domain controller 106 of the issuing domain circulates a message that lists all user IDs having their logon certificates revoked. This message is signed by the private key of the issuing domain. Other domain controllers 106 utilize this message to determine which parties requesting logon have sufficient credentials. In some instance, it may be necessary for a domain to change its public and private keys and propagate the new public and private key to other domain controllers 106. As a result, the existing logon certificates 110 issued by the domain are no longer valid.

It should be appreciated that each domain controller 106 can mark certain resources within the domain that are to be accessible to visitors that logon via logon certificates 110. A special account may be provided within the namespace of the domain to handle such visitors.

While the present invention has been described with reference to a preferred embodiment thereof, those skilled in the art will appreciate that various changes in form and detail may be made without departing from the spirit and the scope of the present invention is defined in the appended claims.

We claim:

1. In a distributed system logically partitioned into domains and each user having an associated home domain, a method comprising the steps of:

encrypting credentials about a user to produce a block of encrypted credentials information;

attaching a digital signature to the block of encrypted credentials information at the home domain for the user using a private key for the home domain;

receiving a session key from the user;

encrypting the digital signature and the block of encrypted credentials information to produce a secure package;

providing the secure package to the user to enable the user to logon to the distributed system in a domain other than the home domain.

2. The method of claim 1 wherein the step of attaching the digital signature to the block of encrypted credentials information further comprises the steps of:

using a hash function to generate a hash value of the credentials information; and other data like expiration time.

selecting an encryption key;

encrypting the hash value and selected encryption key using the domain's private key to produce the digital signature.

3. The method of claim 1 wherein the distributed system includes a portable computer having memory and wherein the step of providing the secure package to the user comprises the step of storing the secure package in the memory of the portable computer.

4. The method of claim 1 wherein the step of providing the secure package to the user comprises the step of storing the secure package on a portable storage medium.

5. The method of claim 4 wherein the portable storage medium is a floppy disk and wherein the step of storing the secure package on the portable storage medium comprises storing the secure package on the floppy disk.

6. The method of claim 1 wherein each domain includes a domain controller for overseeing administration and security for the domain and wherein the step of encrypting credentials information about the user is performed using an encryption key that is unique to the home domain.

7. The method of claim 6, further comprising the step of distributing the public key of the user's home domain only to other domain controllers for use in decrypting the block of encrypted credentials information.

8. In a distributed system, a method comprising the steps of:
providing a user with a first option of logging on to the distributed system wherein a secure package holding credentials is required;
providing a user with a second option of logging on to the distributed system wherein a secure package holding credentials is not required;
receiving a user request to logon using the first option;
examining the secure package holding credentials to determine whether the user has sufficient credentials to be permitted to logon;
where it is determined that the user has sufficient credentials, permitting the user to logon; and
where it is determined that the user lacks sufficient credentials, prohibiting the user from logging on.

9. In a distributed system logically partitioned into domains wherein each user has an associated home domain, a method comprising the steps of:
providing a secure package holding credentials to a user to allow the user to logon to the distributed system outside of the associated home domain of the user;
establishing a time of expiration for the secure package holding credentials; and
after the time of expiration has passed, prohibiting the user from using the secure package holding credentials to logon to a distributed system.

10. In a distributed system logically partitioned into domains wherein each user has an associated home domain, a method comprising the steps of:
receiving a request from a user to receive a secure package holding credentials that will enable the user to logon to the distributed system outside the associated home domain of the user;
prompting the user for a password;
encoding information indicative of the password in the secure package holding credentials;
issuing the secure package holding credentials to the user; and
requiring the user to show knowledge of the password when attempting to logon using the secure package holding credentials.

11. In a distributed system, a method comprising the steps of:
issuing a secure package holding credentials to a user to enable the user to logon to the distributed system using the secure package holding credentials to show that the user has sufficient credentials;
revoking the secure package holding credentials so that the secure package holding credentials may no longer be used to logon to the distributed system.

12. A distributed system partitioned into domains wherein each user has an associated home domain, each domain comprising:
a secure package issuing facility for issuing secure packages holding credentials to users for whom the domain is the home domain;
an authorization and authentication facility for determining whether a user is permitted to logon to the domain, said authorization and authentication facility comprising:
a secure package examiner for examining secure packages holding credentials of users to determine whether the users are permitted to logon to the domain and using any authorization information in the secure package holding credentials to establish rights and privileges for the user.

13. The distributed system of claim 12, further comprising a portable computer having a memory for storing a secure package holding credentials for a user.

14. The distributed system of claim 12, further comprising a revocation facility for revoking secure packages holding credentials for users.

15. The distributed system of claim 12 wherein the secure package holding issuing facility further comprises an encryption facility for encrypting credentials held in the secure package credentials.

16. The distributed system of claim 12 wherein the secure package issuing facility further comprises a digital signature facility for incorporating a digital signature into each secure package holding credentials.

* * * * *